Dec. 17, 1963    J. A. McCANN    3,114,263
SUBCOOLING DETECTOR
Filed May 2, 1962    3 Sheets-Sheet 1

$\bar{O}$ = OPERATE SWITCH CLOSED
$\bar{P}$ = POWER SWITCH CLOSED
$\bar{D}$ = DIFFERENCE SWITCH CLOSED
WITHOUT SUPERIOR BAR, THE
    SWITCH IS OPEN.

INVENTOR.
Joseph A. McCann
BY
Roland A. Anderson
ATTORNEY.

United States Patent Office 3,114,263
Patented Dec. 17, 1963

3,114,263
SUBCOOLING DETECTOR
Joseph A. McCann, Scotia, N.Y., assignor to the United States of America as represented by the United States Atomic Energy Commission
Filed May 2, 1962, Ser. No. 192,017
6 Claims. (Cl. 73—359)

The present invention relates to a new and improved temperature measuring device and more particularly to a device for detecting and measuring directly the subcooling margin in a liquid bulk coolant.

This invention is especially adaptable to systems containing a heat source and a heat removal system using a liquid heat transfer medium, such as in a nuclear power reactor. In such systems, where a liquid heat transfer medium is used, a knowledge of boiling conditions of the bulk coolant is of primary interest in order to achieve maximum heat transfer rates and efficiently generate steam.

The boiling condition to be considered is a heating surface boiling phenomenon known as subcooled boiling or subcooled nucleate boiling which occurs when the bulk temperature of the liquid is still below the saturation temperature, but the temperature of the heating surface is above saturation temperature. At this stage, vapor bubbles form at the heating surface, within the superheated boundary layer, but collapse and condense in the relatively cold bulk liquid, so that no net generation of vapor is realized.

Subcooled boiling is to be distinguished from saturation nucleate boiling, the latter of which is a common phenomenon encountered in standard power-plant steam generators. Saturation nucleate boiling occurs when the bulk liquid is at the saturation point and all the energy goes into the formation of bubbles. Since during saturation nucleate boiling the rate of heat transfer is high and system conditions must be adjusted accordingly, it becomes important to anticipate saturation nucleate boiling conditions by detecting and measuring subcooled boiling. Further details concerning the principles of heat transfer in boiling liquids may be found in Principles of Nuclear Engineering, S. Glasstone, 1955, p. 694 et seq.

Methods devised for measuring and detecting subcooling have heretofore been highly inadequate, being neither sufficiently sensitive nor accurate. One prior art method of measuring the subcooling margin is to first obtain the saturation temperature ($T_{sat}$) by measuring the pressure and converting to temperature from standard steam tables. Second, actual bulk temperature ($T_b$) is measured locally by a standard thermocouple. Third, by subtracting the actual bulk temperature ($T_b$) from the saturation temperature ($T_{sat}$) the subcooling margin ($T_{sc}$) is obtained. Or expressed mathematically:

$$T_{sc} = T_{sat} - T_b$$

where $T_{sc}$ = subcooling margin,
$T_{sat}$ = saturation temperature, and
$T_b$ = actual bulk coolant temperature.

However, error analysis of the data thus obtained shows that the probable (R.M.S.) variance is 7.2° F. (±3.6) for the calculated subcooling margin. Further, in the case of nuclear power reactors, boiling in individual channels changes the local pressures (and flows). Thus, reference to steam tables, to determine ($T_{sat}$), does not provide for an accurate determination of the subcooling margin. Also, this prior method has no provision for measuring the subcooling directly.

Other prior art methods are available for measuring temperature differences directly. However, these other methods generally employ the use of two thermocouples displaced apart in a flow channel and the measured temperature differential between the thermocouples is indicative of and a function of flow rates. None of the prior art methods can accurately and directly measure the subcooled margin in a liquid bulk coolant.

With a knowledge of the shortcomings of conventional methods for measuring subcooling and the lack of any way to accurately measure the subcooling margin directly, it is a primary object of this invention to directly and accurately measure the subcooling margin of a liquid bulk coolant.

Another object of this invention is to provide a means of anticipating when high heat fluxes can be obtained in a heat transfer system using a liquid heat transfer medium.

Another object of this invention is to provide a means of determining when an outlet boiling condition exists such as in a nuclear power reactor.

Still another object of this invention is to provide a means for detecting and anticipating excessively high heat fluxes such as in a nuclear power reactor to thereby enable one to prevent "burn-out" or departure from nucleate boiling, which may result in catastrophic physical failure of fuel elements due to a reduction in heat transfer coefficient while increasing power.

Other objects and advantages of this invention will become more apparent upon a consideration of the following description and the accompanying drawings in which.

The above objects have been accomplished in the present invention by using an electrically heated thermocouple sensor and associated measuring and control circuits. Using the heated thermocouple, a small amount of nearly stagnant bulk coolant is heated to the boiling point. The sequential measurement of the original ambient temperature, zeroing out this ambient temperature and then measuring the boiling temperature of a single mass of coolant permits determination of the subcooling margin of the ambient liquid. Such a device with the proper readout circuit in effect senses the release (at the inception of boiling) of the superheat stored in the film of coolant immediately adjacent to the heated thermocouple surface. This phenomenon must occur and be sensed to detect the inception of subcooled boiling and to measure the degree of subcooling.

Figure 2:
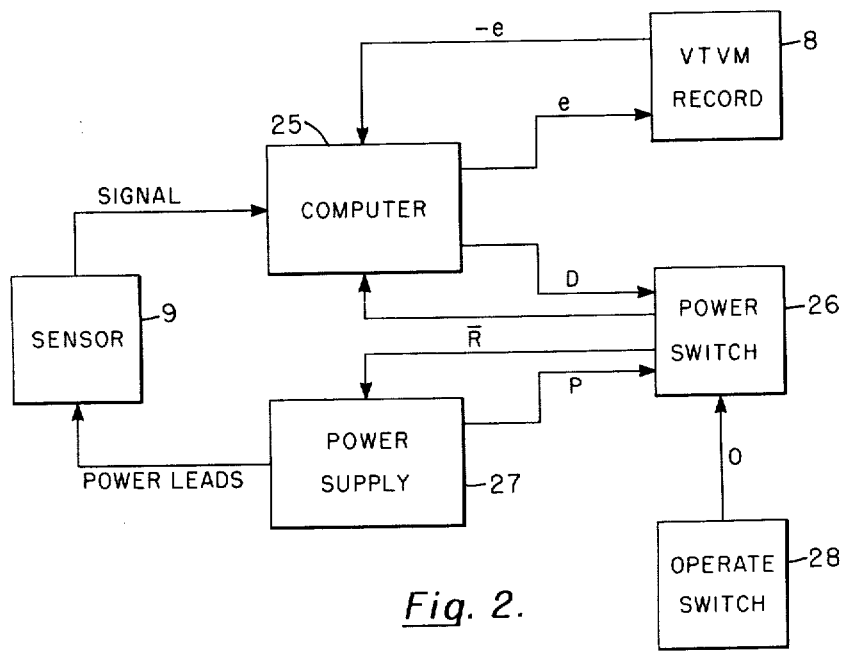
FIG. 2 is a block diagram of the circuit used for measuring subcooling margin of a liquid bulk coolant.
Figure 1:
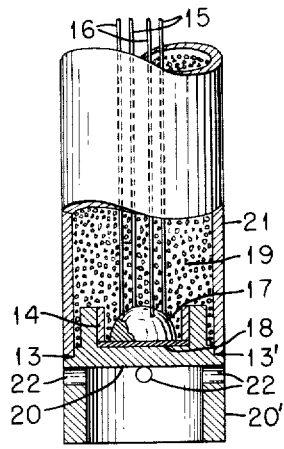
FIG. 1 is a central longitudinal sectional view of a heated thermocouple sensor of the type used in the subcooling detector of this invention.
Figure 4:
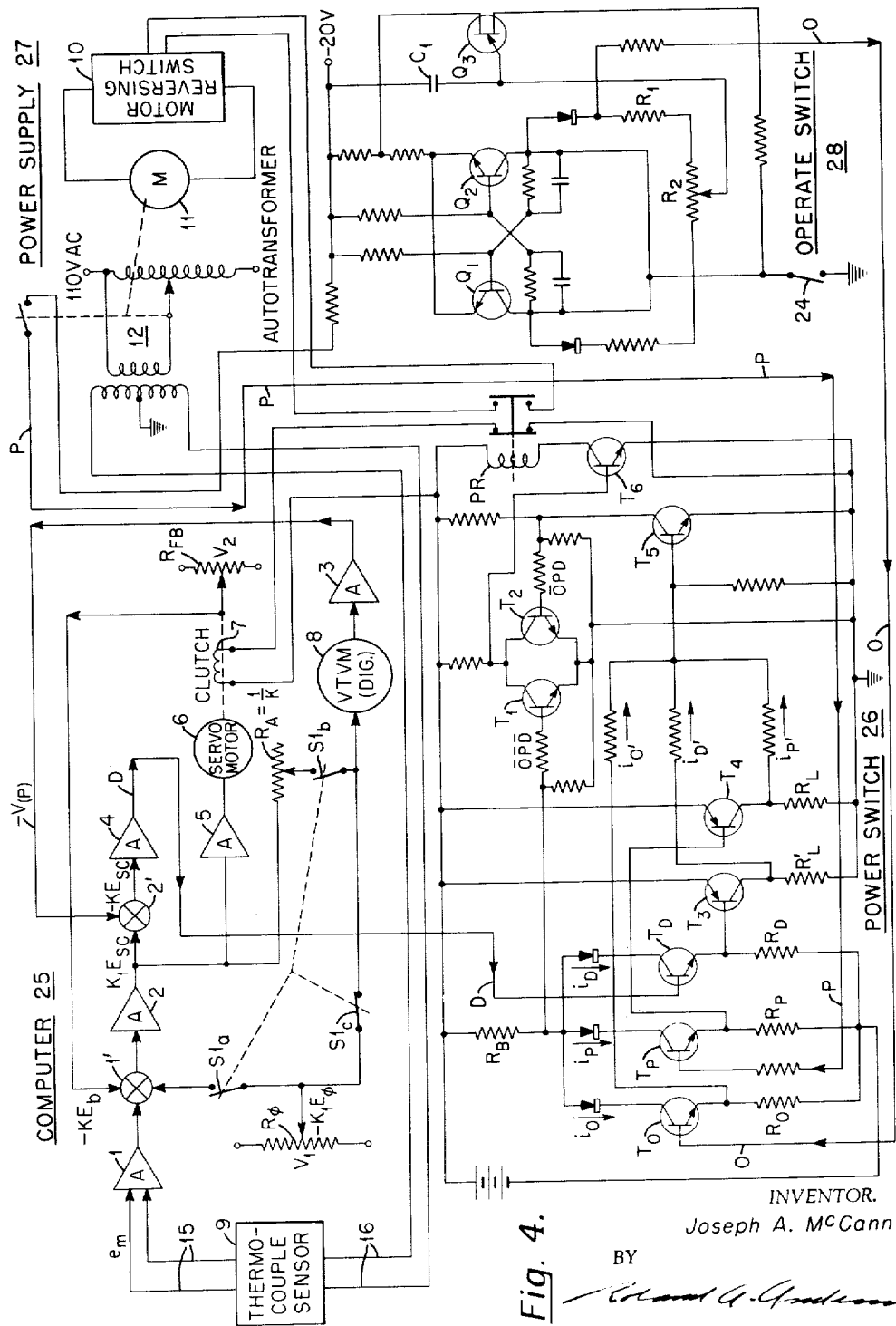
FIG. 4 is a schematic circuit diagram showing the details of the block diagram of FIG. 2.

With reference to the drawings, FIG. 1 shows a heated thermocouple sensor which is used with the circuits of FIG. 2 and FIG. 4. In FIG. 1, the sensor comprises essentially a hollow metal tube 21 provided with a metal end plug 20 to which is attached the thermocouple junction 17. The hollow metal tube 21, the length of which depends on its location in the heat transfer system, may be made of stainless steel or other metal. The choice of metal will depend on the corrosive properties of the heat transfer medium. The metal end plug 20, machined to fit the end of the hollow tube 21, is provided with an inner recess and is welded to the tube with a tube-to-plug weld 13, 13'. This plug 20 may also be made from stainless steel or other metal, depending upon the heat transfer characteristics desired. An annular insulating bead 14 is fitted closely within the inner recess of plug 20. The thermal junction 17 is formed from thermocouple wires 15 and two heater wires 16, and this junction is connected to the plug cavity formed by the inner recess of plug 20 by a brazed or welded joint 18.

The thermocouple wires 15 may be chromel-alumel or any other suitable combination, depending upon the temperature range of the system. The heater wires 16 may be copper, Chromel or Nichrome, but need not be limited to these three. The junction 17 may be Chromel, for example, and is heated by means of the heater wires 16 during a heating cycle to be described below. Insulating material 19 is provided in the form of crushable alumina or an equivalent material to insulate the wires 15, 16 from the hollow tube and from each other.

For use in high velocity coolant flow, the end plug 20 is provided with a hooded tip 20'. When used in relatively slow velocity coolant flow, this hooded tip 20' may be eliminated, if desired. The hood is intended to establish constant flow angle incidence upon the heated surface of the end plug. Under heater power the water nearest the heated surface will become hotter (hence less dense). Therefore, the small vent holes 22 permit the water to escape from the cavity. In this manner the cavity flow is maintained nearly constant at natural convection flow rates.

It should be noted that a physical clearance is provided between the end plug and the inner diameter of the tube 21 at the elevation of the plug braze or weld 18. This clearance forces the heat from the electric heater out the surface parallel to the assembly tip. In this manner only one small surface will have boiling, and the power requirements will be minimized. It should also be noted that the metal plug 20 design is not limited to the type with an inner recess, but may be flat on the inner surface and the thermal junction and heater wires brazed or welded directly to this flat inner surface.

The read-out equipment to which the thermocouple sensor of FIG. 1 is connected is illustrated in the block diagram of FIG. 2. The read-out circuit comprises a thermocouple sensor 9, a power supply 27, a computer 25, a power switch 26, and operate switch 28, and a commercial digital vacuum tube voltmeter 8. The power supply 27 provides current supply to the thermocouple heater wires and is turned on and off by an input from the power switch 26. The power switch 26 also provides a control for a servo-motor clutch in the computer 25 for balancing and resetting in a manner to be described below in connection with FIG. 4. The E.M.F. generated in the thermocouple wires is fed as an input to a thermocouple amplifier in the computer 25 to be described below. The computer 25 zeros out the initial bulk coolant temperature before the power supply is actuated to start a heating cycle for the sensor 9. The VTVM 8 records a final temperature reading of the liquid at boiling. The computer 25 is provided with means to make allowance for a superheat temperature ($\Delta T_{sat}$) such that the VTVM 8 directly records an accurate indication of the subcooling margin.

The power switch 26 is provided with three gate circuits to provide a logic $\overline{R}$ function output to control the power supply 27 and the servo clutch in the computer 25 in a manner to be described below. The computer 25 provides an equivalent open or closed switch function input D to one of the gate circuits in power switch 26. The operate switch 28 provides an open or closed switch function input to another of the gate circuits in power switch 26, and the power supply 27 provides an open or closed switch function input to the other gate circuit in the power switch 26 in a manner to be fully described below in connection with FIG. 4. The thermocouple sensor 9 is installed in the desired location (e.g., a nuclear power reactor core) and electrically connected in the measuring circuit as in the circuit diagram of FIG. 4.

Referring now to the detailed circuits of FIG. 4, the thermocouple wires 15 of the sensor 9 are connected to an amplifier 1 in the computer 25. At zero heater power to the sensor 9, the E.M.F. $e_m$ generated by the thermocouple sensor 9 is fed to the amplifier 1 which amplifies with a gain $K_1$ the received signal and feeds this amplified signal as an input to a summing junction 1'. Also fed to the summing junction 1' is a negative voltage $-K_1 E_\phi$ which is proportional to $\Delta T_{sat}$. This negative voltage is initially set by connecting this voltage to the VTVM 8 through switch $S1_c$ and adjusting the potentiometer $R_\phi$ so that the VTVM 8 reads, directly, a voltage exactly equal to a calculated value of $\Delta T_{sat}$ in degrees Fahrenheit for a given pressure. The switch $S1_c$ is then opened and switches $S1_a$ and $S1_b$, ganged to switch $S1_c$, are then closed. The negative, preset voltage $-K_1 E\phi$ is then connected to summing junction 1' through switch $S1_a$. The output of summing junction 1' is fed to an amplifier 2. The output from amplifier 2 is fed to a summing junction 2' (whose output is fed to an amplifier 4), to a servo amplifier 5, and to the VTVM 8 through a potentiometer $R_A$ and switch $S1_b$. During this stage of operation, the power relay PR in the power switch 26 is deenergized. Thus the clutch 7 in the servo system of the computer 25 is energized. Thus, an error voltage at summing junction 1' is amplified by amplifier 2 and amplifier 5 to drive the servo motor 6. The potentiometer $R_{FB}$ is rotated by motor 6 and the engaged clutch 7 to generate a feedback voltage $-KE_b$. Thereby summing junction 1' is driven to zero. At the same time, the output of VTVM 8 is reversed-phased through an amplifier 3 to the summing junction 2'. Thus summing junction 2' is also driven to zero. The multiplier potentiometer $R_A$ is adjusted such that the VTVM 8 provides a direct reading in degrees Fahrenheit.

The power switch 26 is provided with three gate transistors $T_O$, $T_P$, and $T_D$. These three transistors provide for a first and a second AND function. The first AND function controls a transistor $T_1$ and the second AND function controls a transistor $T_2$. The transistors $T_1$ and $T_2$ constitute an OR gate. When either of these transistors $T_1$ and $T_2$ conducts, the power relay PR is energized through a control transistor $T_6$. When the power relay PR is energized, the clutch 7 in the computer 25 is deactivated and the power supply 27 is activated to start a heating cycle for the heater of the sensor 9.

The three gate transistors $T_O$, $T_P$, and $T_D$ of the power switch 26 must all be conducting to provide the first AND function discussed above. These three transistors will conduct when there is an equivalent closed switch input to the respective bases of these transistors. The base of transistor $T_O$ is connected by a lead O to the output of the operate switch 28. The base of transistor $T_P$ is connected to the lower limit switch of the autotransformer of the power supply 27. The switch function to the base of transistor $T_P$ is fed thereto over a lead P from the above mentioned limit switch such that the transistor $T_P$ conducts only when the limit switch is closed at zero power from the power supply 27. The base of transistor $T_D$ is connected by a lead D to the output of the amplifier 4. When the output of amplifier 4 is at zero, this is equivalent to a closed switch input over lead D to the base of transistor $T_D$ and this transistor will then be conducting. When the output of amplifier 4 is other than zero, which is equivalent to an open switch function, the transistor $T_D$ will then be non-conducting.

The power supply 27 which supplies heating current to the sensor 9 by means of leads 16 comprises a variable autotransformer 12 which is controlled by a reversible motor 11 under control of a motor reversing switch 10.

The power increases as time squared. The power switch 26 phases the motor 11 by means of controlling the motor reversing switch 10 by the power control relay PR.

The operate switch 28 is a mutivibrator of a fixed frequency and a variable duty cycle, and includes a switch 24, transistors $Q_1$, $Q_2$, $Q_3$, resistors $R_1$, $R_2$, and condenser $C_1$. The resistor $R_2$ is used to adjust the duty cycle of the multivibrator. The desired frequency of measurement, about 1–5 times per second, is established by the following formula:

$$f = \frac{1}{(2R_1 + R_2)C_1}$$

$R_2$ is usually set to ¼–½ of the total cycle time. If the measured value of the subcooling $T_{sc}$ is too great a value (50° F.) the off portion of cycle initiates a recycle.

Figure 5:
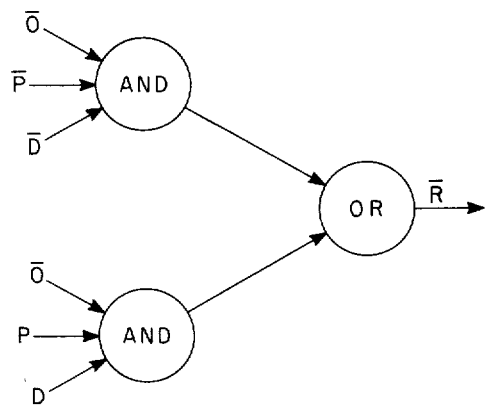
FIG. 5 is a schematic circuit diagram depicting the logic "AND", "OR" functions of the circuit of FIG. 4.

There is a chassis power switch, not shown, which turns on the entire system except the operate switch. After the summing junctions 1' and 2' in the computer 25 are driven to zero, at no heater power to the sensor 9, the gate transistor $T_D$ will then conduct. Transistor $T_P$ is already conducting since the lower limit switch of the power supply is closed, and when the transistor $T_O$ conducts in response to a signal from the operate switch 28, the first AND function from transistors $T_O$, $T_P$, $T_D$ is generated and will cause the OR gate transistor $T_1$ to conduct. Thus when the three currents $i_O$, $i_P$, $i_D$ are flowing, the OR gate transistor $T_1$ will conduct. The conduction of transistor $T_1$ will cause energization of the power relay PR which deactivates the clutch 7 in the computer 25 and at the same time actuates the motor 11 to drive the autotransformer 12 to supply heating current to the sensor 9. Two events then occur. First, the thermocouple voltage $e_m$ starts changing as a function of the heater power such that there appears at summing junction 1' an error voltage $E_{1(P)}$, since $-KE_b$ no longer changes because the clutch 7 has been deactivated. $E_{1(P)}$ is the error voltage as power changes, and is determined from the following formula:

$$E_{1(P)} = K_1 e_{m(P)} - K_1 E_\phi - K E_b$$

where $e_{m(P)}$ is the change of thermocouple voltage as a function of power. At summing junction 2' there appears an error voltage $E_2 = E_{1(P)} - V_{(P)}$. When $E_{1(P)}$ is changing there is a residual error voltage, above, of $E_2$. This $E_2$, amplified by amplifier 4, triggers the gate transistor $T_D$ to an equivalent open position such that $T_D$ is now non-conducting. This feedback error circuit is used to keep a fixed gate trigger voltage, and hence, not overdrive the gate transistor $T_D$. The second event that occurs is that the lower limit switch of the power supply referred to above opens when the power supply starts the heating cycle for sensor 9. When this occurs, the gate transistor $T_P$ then reverts to an unfired condition. Thus, there is obtained from the gate transistors $T_O$, $T_P$, $T_D$ a second AND function. This second AND function occurs when the transistor $T_O$ is conducting and the transistors $T_P$ and $T_D$ are non-conducting. When transistors $T_P$ and $T_D$ become non-conducting, then transistors $T_3$ and $T_4$ will conduct and the voltage across resistances $R_L'$ and $R_L$ becomes positive from ground reference. Thus there are obtained three positive voltages, one for each function. Only when all the three currens $i_O'$, $i_D'$, $i_P'$ flow does the transistor $T_5$ conduct. When $T_5$ conducts, the OR gate transistor $T_2$ will then conduct and thus the power relay PR is kept energized. The second AND function is generated immediately after the first AND function is generated such that the power relay PR is first energized by the conduction of $T_1$ and then is maintained energized by the conduction of $T_2$ by the second AND function. FIG. 5 shows the AND and OR functions of the power switch 26 of FIG. 4.

The error voltage $E_{1(P)}$, mentioned above, at the summing junction 1', reads directly in degrees F. at the VTVM 8. The final value holds in as a regular reset feature of this commercial digital vacuum tube voltmeter. It should be noted that $E_{1(P)}$ can be recorded, if desired, by other permanent record means. As $$\frac{dE_1}{dt} = 0, \text{ at } T_{sat}$$

then instantaneously $E_2 = 0$, the OR gate reverts to unfired position and power is shut off. With the power switch off, that is, relay PR deenergized, the computer resets to zero and is ready for the next heating cycle, and the motor 11 drives to the lower limit switch.

The functioning of the power switch 26 may be summarized as follows: (It should be noted that there are eight ways that the three switches may be oriented with only open or closed as possibilities.)

| | Operate Switch | Power Switch | Diff. Switch | Action |
|---|---|---|---|---|
| 1 | O | O | O | Reset, servo balancing and power returning to zero. |
| 2 | O | C | O | Reset, servo balancing. |
| 3 | O | C | C | Reset, ready to operate at closing of operate switch. |
| 4 | C | C | C | Start. |
| 5 | C | O | O | Operation. |
| 6 | C | C | C | Reset, $T_{sat}$ detected. |
| 7 | C | C | O | Reset, servo balancing. |
| 8 | O | O | O | Reset, power returning to zero. |

From the above table it can be seen that these are two conditions when power should be increasing: when O, P and D are closed and the first AND function is generated, or when O is closed and P, D are open and the second AND function is generated. At all other times power must be decreasing or set at zero. When the difference switch is open there is an error signal in the summing junction 2', or measurement is going on. When the difference switch is closed there is a zero error signal at summing junction 2' which means either initial balance or at $T_{sat}$.

Figure 3A:
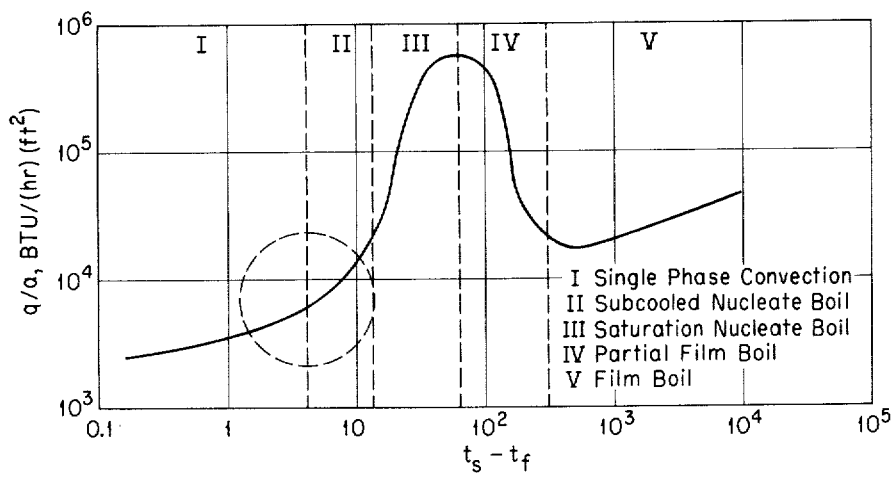
FIG. 3a is a standard curve which shows variations of heat flux with surface-liquid temperature difference in a water boiling system.
Figure 3B:
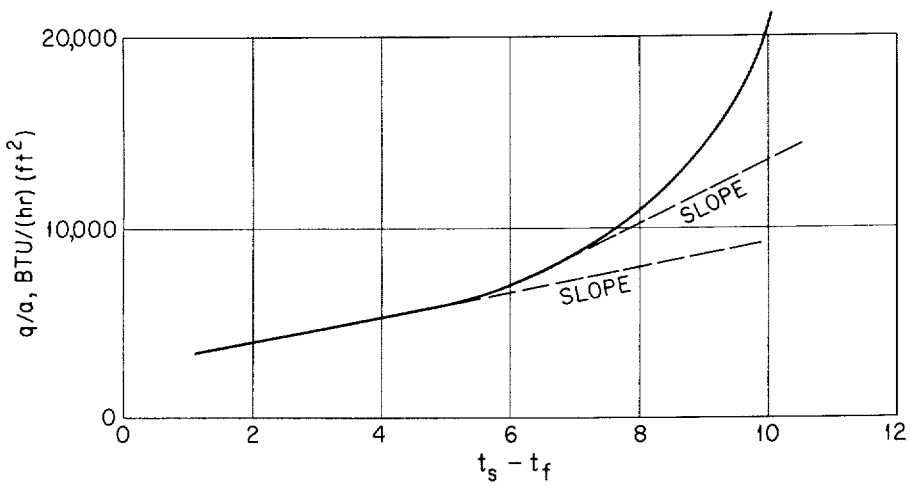
FIG. 3b is a linear expansion of the curve in FIG. 3a in the circled section.

In order to better understand the operation of the present invention, reference is made to FIGS. 3a and 3b. FIG. 3a is a standard boiling curve for a liquid such as water, showing the variation of heat flux [B.t.u./(hr.)(ft.²)] with boiling surface temperature minus liquid temperature [$(T_S - T_F)$, where $T_S$ = heated surface temperature, and $T_F$ = average liquid coolant temperature]. FIG. 3b is an expansion of FIG. 3a in the circled section which is in the region of subcooled nucleate boiling. It is in this region, around the first knee in the curve of FIG. 3a, that as the surface heat flux is increased, the heat transfer in the liquid changes from single phase convection to nucleate boiling. The knee occurs at some temperature higher than the liquid saturation temperature ($T_{sat}$), and this higher temperature is the superheat temperature ($\Delta T_{sat}$) necessary to initiate bubble formation. This superheat temperature is measurable by experiment. It will be noted that the slope of the curve in FIG. 3b changes radically at temperature $T_{sat} + \Delta T_{sat}$. Therefore, increasing the surface heat flux, and simultaneously measuring the change of surface temperature, a monotonic increase exists until boiling starts. The great change in slope is indicative of boiling. Simultaneously this indicates the saturation temperature independent of any exact knowledge of the pressure.

The system of FIG. 4 provides for a direct measurement of the subcooling temperature margin ($T_{sc}$). This margin can be expressed in the following formula:

$$T_{sc} = T_2 - T_b - \Delta T_{sat}$$

where $T_2$ = saturation temperature at slop change which occurs at boiling;

$T_b$ = bulk coolant temperature at zero heat flux; and $\Delta T_{sat}$ = superheat temperature.

It can be seen that the computer in the system of FIG. 4 makes a correction for the ($\Delta T_{sat}$) term by incorporating the voltage, $-KE_\phi$, for this function. Also, the design of the computer of FIG. 4 is such that knowledge of ($T_b$) can be ignored since this signal is zeroed out by the feedback circuit to summing junction 1' at zero power before the heating cycle is initiated for the thermocouple sensor. Thus, it should be evident that during a heating cycle for the sensor 9 the summing junction 1' computes a direct measurement of the subcooling and the vacuum tube voltmeter 8 reads out this measurement, and the final value (at boiling) is held in as a regular reset feature of this commercial digital unit.

The sensor 9 is designed to operate to a critical temperature of water (707° F.) and to a pressure of 3500 p.s.i. Since ($T_b$) is zeroed out by the computer of FIG. 4, there is no error in the computed measurement except that which may be due to the electronic circuitry, and to a possible defective thermocouple. In any event, the maximum possible estimated sensor error is about 1.5° F. and the maximum possible instrument error is about 1.0° F. over a span of 50° F. Thus, the maximum possible system error is about 2.5° F., or there is a possible R.M.S. error of about 1.2° F. This should be so over the entire pressure range of 15–3500 p.s.i.

The term ($\Delta T_{sat}$) which depends upon heat flux and pressure of system and which is represented by the voltage ($-KE_\phi$) in the computer of FIG. 4 can be calculated from the following formula:

$$T_{sat} = \frac{A(\phi/10^6)^{0.25}}{e^{-P/900}}$$

where $A$ = heating surface area,
$\phi$ = heat flux ($q/A$), and
$p$ = local pressure.

Then it can be shown that:

$$\frac{d(\Delta T_{sat})}{\Delta T_{sat}} = \frac{1}{4}\frac{d\phi}{\phi} + \frac{1}{900}\frac{dP}{P}$$

Or, in words, the percentage error in determining $\Delta T_{sat}$ is equal to the sum of one-fourth the error in reproducing the heat flux plus 1/900 of successive measurements, the pressure variation error. The total estimated error is less than 1° F. for all ranges and is associated with electronic circuitry. Thus, it can be seen that the measuring system of FIG. 4 can provide a fairly accurate and direct measurement of the subcooling margin of a liquid coolant such as used in a nuclear power reactor.

It should be noted that the system of FIG. 4 is not limited for use with a four-wire thermocouple such as described for FIG. 1. For example, a coaxial thermocouple may be used. A wire of thermoelectric material is insulated from and surrounded by a tube of a different thermoelectric material. This subassembly in turn is insulated from and surrounded by a sheath tube. The thermoelectric wire and tube leads are used both as heaters and detectors. Any advantage for this coaxial thermocouple would be the case when only two leads are possible. By varying wire diameter and internal sheath dimension it should be possible to obtain a thermocouple with equal resistance in each leg. Then the problem of balancing heater currents in the thermocouple legs would be simplified.

Although the above described subcooling detector is adapted for particularly determining the subcooling margin of a liquid coolant, it should be apparent that the device is equally adapted to detecting the fixed subcooling margin of steam voids. In this instance the heating power is maintained constant. The derived signal then depends upon the different surface heat transfer coefficient as the liquid coolant changes from the liquid to the vapor phase. It should also be apparent that the above invention has been described by way of illustration rather than limitation and that this invention is equally applicable in fields other than those described.

What is claimed is:

1. A device for continuously measuring the subcooling margin of a bulk coolant in a cooling channel comprising: a thermocouple sensor disposed in said cooling channel in contact with said bulk coolant and provided with a heater adjacent to the thermojunction of said thermocouple; a power supply for supplying current to said heater, said current increasing with time; a power switch connected to and for control of said power supply; a computer connected to the output of said thermocouple, said computer including a first amplifier connected to said thermojunction and connected in series with a first summing junction, a second amplifier, and a second summing junction, a digital vacuum tube voltmeter connected to the output of said second amplifier, a first variable voltage feedback circuit connected to said first summing junction, a servo motor control means connected to the output of said second amplifier and to said first feedback circuit, a negative voltage connected to said first summing junction, said negative voltage being proportional to the superheat temperature required to initiate bubble formation for a given pressure, and a second, reversed-phased feedback voltage connected between said vacuum tube voltmeter and said second summing junction; a periodically operated operate switch connected to said power switch; said power switch being provided with three control inputs, one from said second summing junction, one from said power supply, and one from said connection from said operate switch, said power switch including an AND gating circuit comprising three gate circuits connected to said three inputs, respectively, an OR gating circuit connected to said AND gate circuit, and a power relay connected to the output of said OR gating circuit, said OR gating circuit providing an output to said power relay in response to a first AND function and to a second AND function generated by said AND gating circuit, said power relay providing an on-off control to said servo motor control means and an off-on control to said power supply, whereby at no heater power to said sensor said first and said second summing junctions are driven to zero by said feedback circuits, said superheat temperature and the initial bulk temperature of said coolant being zeroed out at said first summing junction, said power switch generating said first AND function in response to a zero output signal from said second summing junction to thereby energize said power relay to deactivate said servo motor control means and energize said power supply to begin a heating cycle for said sensor, said second AND function being generated immediately after said first AND function to maintain said power relay energized and said first feedback voltage constant, said first summing junction then computing the sensor voltage changes as a function of increasing coolant temperature which changes as a result of increasing sensor heater power, said vacuum tube voltmeter measuring said voltage changes and recording a final steady state temperature which occurs at boiling and at no further change in sensor voltage, said final temperature being a direct measurement of the subcooling margin of said coolant.

2. The measuring device of claim 1, wherein said first AND function is generated when said three gate circuits of said AND gating circuit are opened, and said second AND function is generated when the gate circuit connected to said operate switch is opened and the other two AND gate circuits are closed.

3. The measuring device of claim 1, wherein at the termination of a heating cycle for said sensor, means are provided for returning said power supply to zero power, and said summing junctions are reset to their initial condition by said feedback circuits such that said measuring device is then ready to compute another measurement of the subcooling margin.

4. A device for continuously measuring the subcooling margin of a bulk coolant in a coolnig channel comprising: a thermocouple sensor disposed in said cooling channel in contact with said bulk coolant and provided with a heater adjacent to the thermojunction of said thermocouple, a power supply for supplying current to said heater, said current increasing with time; a power switching circuit connected to and for control of said power supply; a computer connected to the output of said thermocouple, a periodically operated operate switch connected to said power switching circuit; said computer having a first output and a second output and including means for driving said outputs to zero at no heater power to said sensor; said power switching circuit including three input control circuits and an output power relay, said second output of said computer being connected to one of said power switching circuit input circuits, said operate switch being connected to another of said input circuits, said power supply including a control on-off switch function connected to the other of said power switching circuit input circuits, said power relay being controlled by said input control circuits such that said power relay is energized when all of said control circuits are conducting and subsequently when said operate switch controlled input circuit is conducting and the other two input circuits are not conducting; said power relay providing an off-on control to said power supply and an on-off control said zero driving means of said first output of said computer; and a vacuum tube voltmeter connected to said first output of said computer, whereby after said power supply is energized by said power control relay to begin a heating cycle for said sensor said computer first output computes the sensor voltage changes as a function of increasing coolant temperature which changes as a result of increasing sensor heater power, said vacuum tube voltmeter measuring said voltage changes and recording a final steady state temperature which occurs at boiling and at no further change in sensor voltage, said computer further including means for compensating for the superheat temperature required for boiling at a given pressure such that said recorded final temperature measurement is a direct and substantially accurate measurement of said subcooling margin.

5. A device for continuously measuring the subcooling margin of a bulk coolant in a cooling channel comprising: a thermocouple located in said channel; means for measuring the initial output voltage of said thermocouple at an initial temperature; means for heating said thermocouple and said coolant at a continuously increasing rate to thereby increase said output voltage; means for subtracting said initial output voltage from the instantaneous output voltage of said thermocouple; means for interrupting said heating means when the boiling temperature of said coolant is reached; means for indicating and recording the value of said output voltage at said boiling temperature; and means for compensating said output voltage at boiling by a voltage proportional to the superheat temperature required for boiling of said coolant to provide a direct indication of the subcooling margin of said coolant.

6. An improved method for directly and accurately measuring the subcooling margin of a bulk coolant in a cooling channel comprising the steps of measuring the thermocouple voltage of a thermocouple junction placed in said channel which is a function of the initial bulk temperature of said coolant; zeroing out said initial bulk temperature measurement; heating said thermojunction of said thermocouple with a current increasing with time; measuring the changes in voltage of said thermocouple which result from changes in temperature of said coolant effected by said heating; measuring a steady state temperature which occurs at boiling of said coolant and at no further thermocouple voltage change, and compensating said steady state temperature measurement by the superheat temperature required for boiling of said coolant at a given pressure such that a final temperature measurement is provided which is a direct measurement of the subcooling margin of said coolant.

No references cited.

UNITED STATES PATENT OFFICE
CERTIFICATE OF CORRECTION

Patent No. 3,114,263　　　　　　　　　　　December 17, 1963

Joseph A. McCann

It is hereby certified that error appears in the above numbered patent requiring correction and that the said Letters Patent should read as corrected below.

Column 2, line 66, for "essentailly" read -- essentially --; column 5, line 4, for "mutivibrator" read -- multivibrator --; line 63, for "currens" read -- currents --; column 6, in the table, under the heading "Diff. Switch", last line thereof, for "O" read -- C --; same column 6, line 70, for "slop" read -- slope --; column 9, line 2, for "coolnig" read -- cooling --; line 28, for "said", first occurrence, read -- to --.

Signed and sealed this 2nd day of June 1964.

(SEAL)
Attest:

ERNEST W. SWIDER
Attesting Officer

EDWARD J. BRENNER
Commissioner of Patents